(12) United States Patent
Nasr et al.

(10) Patent No.: US 6,179,066 B1
(45) Date of Patent: Jan. 30, 2001

(54) STABILIZATION SYSTEM FOR MEASUREMENT-WHILE-DRILLING SENSORS

(75) Inventors: Hatem Nasr, Houston; Macmillan M. Wisler, Kingwood, both of TX (US); Joachim Oppelt, Hannover (DE)

(73) Assignee: Baker Hughes Incorporated, Houston, TX (US)

( * ) Notice: Under 35 U.S.C. 154(b), the term of this patent shall be extended for 0 days.

(21) Appl. No.: 09/231,568

(22) Filed: Jan. 14, 1999

Related U.S. Application Data

(63) Continuation-in-part of application No. 09/215,715, filed on Dec. 18, 1998.
(60) Provisional application No. 60/070,933, filed on Dec. 18, 1997, and provisional application No. 60/071,583, filed on Jan. 15, 1998.

(51) Int. Cl.$^7$ ...................................................... E21B 7/06
(52) U.S. Cl. .............................. 175/45; 175/24; 175/76
(58) Field of Search .............................. 175/45, 40, 61, 175/27, 73, 74, 76, 24, 326, 325.3, 325.4

(56) References Cited

U.S. PATENT DOCUMENTS

| | | | |
|---|---|---|---|
| 5,339,036 | * 8/1994 | Clark et al. | 175/50 X |
| 5,341,886 | 8/1994 | Patton | 175/24 |
| 5,507,353 | 4/1996 | Pavone | 175/27 |
| 5,603,386 | 2/1997 | Webster | 175/76 |

FOREIGN PATENT DOCUMENTS

0594419A1   4/1994 (EP).
2305196A    9/1996 (GB).

* cited by examiner

*Primary Examiner*—Robert E. Pezzuto
(74) *Attorney, Agent, or Firm*—Madan, Mossman & Sriram, P.C.

(57) ABSTRACT

The present invention provides a drilling assembly with a stabilization system that stabilizes at least a section of the drilling assembly as a function of one or more downhole measured parameters or parameters of interest. One or more sensors carried by the drilling assembly measure the desired parameters of interest and a control system controls the stabilizer system in response to one or more determined parameters of interest to provide desired stabilization of a section of the drilling assembly. Measurement-while-drilling sensors whose measurements are affected by the parameters of interest are preferably disposed in the stabilized section. In one embodiment, the stabilization system includes at least two axially spaced apart stabilizers. Each such stabilizer includes a plurality of independently adjustable members that radially extend from the drilling assembly to exert force on the wellbore inside. A control circuit processes the signals from the sensors and in response thereto causes a power unit to independently adjust the force applied by the adjustable members so as to maintain a parameter of interest below a predetermined value. The measurement-while-drilling sensors take measurements while the stabilization system is activated, which may be during the drilling of the wellbore or during retrieval of the drilling assembly from the wellbore. In an alternative embodiment, the stabilization system includes only one stabilizer that may contain a plurality of independently adjustable members.

27 Claims, 8 Drawing Sheets

STABILIZATION SYSTEM FOR MEASUREMENT-WHILE-DRILLING SENSORS

CROSS REFERENCES TO RELATED APPLICATIONS

This application is a continuation-in-part of U.S. patent application Ser. No. 09/215,715, filed on Dec. 18, 1998 which claims priority from U.S. application Ser. No. 60/070933 filed on Dec. 18, 1997. This application further claims priority from U.S. application Ser. No. 60/071,583 field on Jan. 15, 1998.

BACKGROUND OF THE INVENTION

1. Field of the Invention

The present invention relates generally to measurement-while-drilling systems and more particularly to a stabilization system on a drill string that improves the quality of formation evaluation measurements.

2. Background of the Art

To obtain hydrocarbons such as oil and gas, a drilling assembly (also referred to as the "bottom hole assembly" or the "BHA") carrying a drill bit at its bottom end is conveyed into the wellbore or borehole. The drilling assembly is usually conveyed into the wellbore by a coiled-tubing or a drill pipe. In the case of the coiled-tubing, the drill bit is rotated by a drilling motor or "mud motor" which provides rotational force when a drilling fluid is pumped from the surface into the coiled-tubing. In the case of the drill pipe, it rotated by a power source (usually an electric motor) at the surface, which rotates the drill pipe and thus the drill bit.

Bottom hole assemblies generally include several formation evaluation sensors for determining various parameters of the formation surrounding the BHA during the drilling of the wellbore. Such sensors includes sensors for measuring the resistivity, dielectric constant, water saturation, porosity, permeability, density and other properties of the formation surrounding the wellbore. Such bottom hole assemblies also include devices to determine the BHA inclination and azimuth, pressure sensors, temperature sensors, gamma ray devices, and devices that aid in orienting the drill bid a particular direction and to change the drilling direction. Acoustic and resistivity devices have been proposed for determining bed boundaries around and in some cases in front of the drill bit.

One or more stabilizers are disposed on the drilling assembly to stabilize the drilling assembly against excessive vibrations of the drilling assembly caused by the cutting action of the drill bit. Stabilizers are usually pads that extend outward from the drilling assembly and come in contact with the borehole. Independently operated pads or ribs that can selectively apply force to the borehole inside have been proposed for altering the drilling direction, i.e., for geosteering the drill bid for directional drilling.

However, certain measurements relating to the formation evaluation parameters, such as nuclear magnetic resonance ("NMR") measurements, are very sensitive to any distortion of the magnetic field in the formation, which occur due to the movement of the magnets caused by normal vibrations of the BHA, even when commonly known multiple stabilizers are used. It is thus desirable to have a stabilization system that would automatically stabilize at least a section of the drill string containing sensors whose quality of measurement are susceptible to vibrations below a predetermined level during the drilling of the wellbore. The present invention addresses the above-noted need and provides a stabilization system for measurement-while-drilling sensors.

SUMMARY OF THE INVENTION

The present invention provides a drilling assembly with a stabilization system that stabilizes at least a section of the drilling assembly as a function of one or more downhole measured parameters or parameters of interest. One or more sensors carried by the drilling assembly measure the desired parameters of interest and a control system controls the stabilizer system in response to one or more determined parameters of interest to provide desired stabilization of a section of the drilling assembly. Measurement-while-drilling sensors whose measurements are affected by the parameters of interest are preferably disposed in the stabilized section.

In one embodiment, the stabilization system includes at least two axially spaced apart stabilizers. Each such stabilizer includes a plurality of independently adjustable members that radially extend from the drilling assembly to exert force on the wellbore inside. A control circuit processes the signals from the sensors and in response thereto causes a power unit to independently adjust the force applied by the adjustable members so as to maintain a parameter of interest below a predetermined value. The measurement-while-drilling sensors take measurements while the stabilization system is activated, which may be during the drilling of the wellbore or during retrieval of the drilling assembly from the wellbore. In an alternative embodiment, the stabilization system includes only one stabilizer that may contain a plurality of independently adjustable members.

A packer element of sufficient length that exerts force on the wellbore inside may be used as the extendable member of the stabilizer. One or more such packers may be used to stabilize the desired section of the drilling assembly or the drill string. In, yet another embodiment, the stabilization system may use one or more passive stabilizers, wherein a spring, a retractable plunger or piston arrangement or any other device continuously urges an extendable member against the wellbore inside to provide the desired stabilization.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF THE PREFERRED EMBODIMENTS

In general; the present provides a drill string for use in a drilling system for drilling oilfield boreholes, wherein the drill string includes a stabilization system that stabilizes at least a section of the drill string or the drilling assembly as a function of a physical parameter of the drill string determined during the drilling of the boreholes. One or more sensors carried by the drilling assembly measure the desired parameters of interest and a control system controls individual stabilizers in response to one or more determined parameter of interest to provide desired stabilization of a section of the drilling assembly. Sensors and devices whose measurements are affected by certain physical parameters of the drilling assembly are preferably disposed in the stabilized section.

Figure 1:
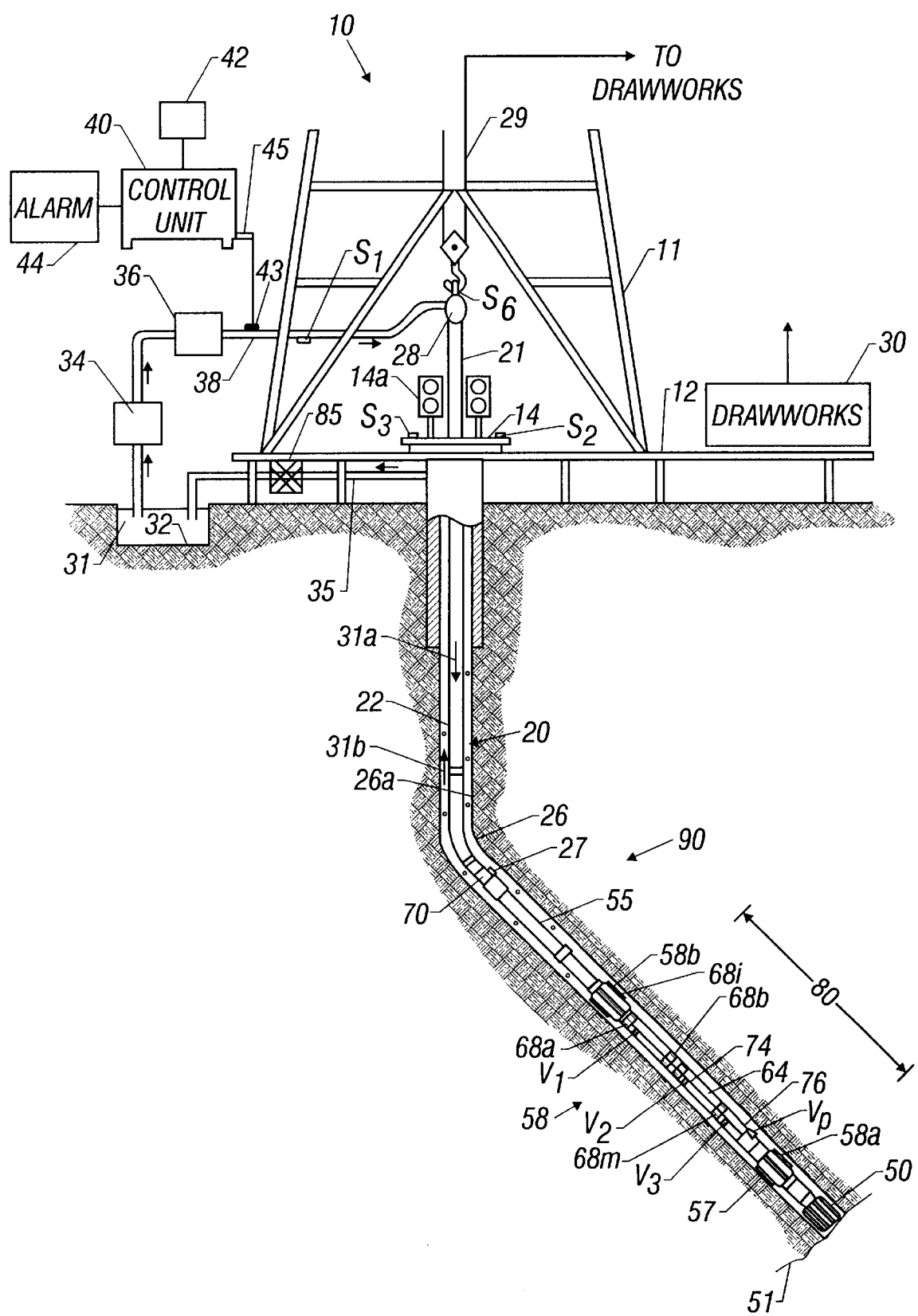
FIG. 1 is a schematic diagram of a drilling system which employs the stabilization system according to the present invention.

FIG. 1 shows a schematic diagram of a drilling system 10 with a drill string 20 carrying a drilling assembly (also referred to as the bottom hole assembly" or "BHA") conveyed in a "wellbore" or "borehole" 26. The drilling assembly 90 includes the stabilization system 58 of the present invention, which is described in detail below and in reference with FIGS. 2–3. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. The drill string 20 is pushed into the wellbore 26 when a drill pipe is used as the conveying member 22. For coiled-tubing applications, a tubing injector, such as an injector 14a, however, is used to move the tubing from a source thereof, such as a reel (not shown), to the wellbore 26. A drill bit 50, attached to the end of the drill BHA 90 is rotated to drill the wellbore 26. If a drill pipe is used, the drill string 20 is coupled to a drawworks 30 via a kelly joint 21, swivel 28 and line 29 through a pulley 23. Drawworks 30 is operated to control the weight on bit ("WOB"), which is an important parameter that affects the rate of penetration ("ROP"). The operations of the drawworks 30 and the tubing injector are known in the art and are thus not described in detail hirein.

During drilling, a suitable drilling fluid 31 (commonly referred to as the "mud") from a mud pit (source) 32 is pumped into the tubing 22 by a mud pump 34. The drilling fluid 31 passes from the mud pump 34 into the drill string 20 (as shown by arrow 31a) via a desurger 36 and the fluid line 38. The drilling fluid 31 discharges at the borehole bottom 51 through openings (not shown) in the drill bit 50. The drilling fluid 31 returns to the mud pit 32 at the surface via the annulus 27 between the drill string 20 and the borehole 26 (as shown by arrow 31b) and a return line 35. A drill cutting screen 85 removes the drill cuttings 86 from the returning drilling fluid 31b. A sensor $S_1$ in the line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provides to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The control unit 40 is preferably adapted to activate alarms 44 when certain unsafe or undesirable operating conditions occur.

In some applications the drill bid 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to affect changes in the drilling direction. The mud motor 55 is coupled to the drill bit 50 via a drive shaft (not shown) disposed in a bearing assembly 57. the mud motor 55 rotates the drill bid 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit.

The drilling assembly 90 includes a stabilizer system, generally denoted herein by numeral 58 that in one preferred embodiment includes a lower stabilizer 58a and an upper stabilizer 58b axially spaced from each other. The stabilizers 58a and 58b are preferably independently adjustable and provide stabilization of a section or zone generally denoted by the section 80. One or more sensors $V_1$–$V_p$ associated with the drilling assembly 90 provide measurements relating to one or more parameters of interest relating to the drilling assembly (also referred herein as the "BHA parameters" or the "drilling assembly parameters"). The sensors $V_1$–$V_p$ are referred to hereafter as the BHA sensors. The BHA parameters may include vibration, lateral displacement, whirl, backward rotation, shock, buckling, acceleration, distance from the wellbore inside or any other physical parameter relating to the drilling assembly 90. The BHA sensor signals are processed downhole or at the surface to determine the desired BHA parameters. A plurality of such sensors are used to determine a profile of the desired BHA parameter(s) along the stabilizer section 80. The operation and other configurations of the stabilizer system 58 are described below with reference to FIGS. 2–3. However, during the drilling of the wellbore 26, the stabilizer system 58 stabilizes the section 80 in response to the determined BHA parameters and may be programmed to maintain any one or more of the BHA parameters below their respective predetermined values or within predetermined ranges of values. Thus, the stabilization system 58 provides continuous stabilization of at least a section 80 of the BHA 90 as a function of one or more BHA parameters.

BHA's usually include a variety sensors for providing downhole measurements during the drilling of the wellbores. For the purposes of this invention all such sensors are generally referred to herein as the "measurement-while-drilling sensors or "MWD" sensors. Any sensors or devices required for use on the BHA 90 whose measurements or operation are sensitive to vibrations, whirl, lateral movement, etc. are preferably placed in the section 80. Such sensors are generally referred to herein by numeral 68 and the individual sensors that make up 68 by numerals 68a–68m The sensors 68a–68m, based on the downhole application, may include nuclear magnetic resonance ("NMR") sensors, electromagnetic wave propagation sensors for determining the resistivity, dielectric constant and water saturation of the formation surrounding the BHA 90, nuclear sensors for determining the porosity and density of the formation, inertial guidance sensors, acoustic and ultrasonic sensors, and directional sensors. In some applications, it may be desirably to place a sensor 68i in the stabilizer, such as the stabilizer 58b so that the sensor will contact the borehole wall (inside) 26a while taking the measurements. Other sensors that may be disposed in the section 80 or in the BHA may include a gamma ray device for measuring the gamma ray intensity, inclinometer, gyroscopic devices, position sensors, acoustic stand off sensors, magnetometers, etc. Such sensors and devices are known in the art and therefore are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above-described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in detail herein.

Figure 2:
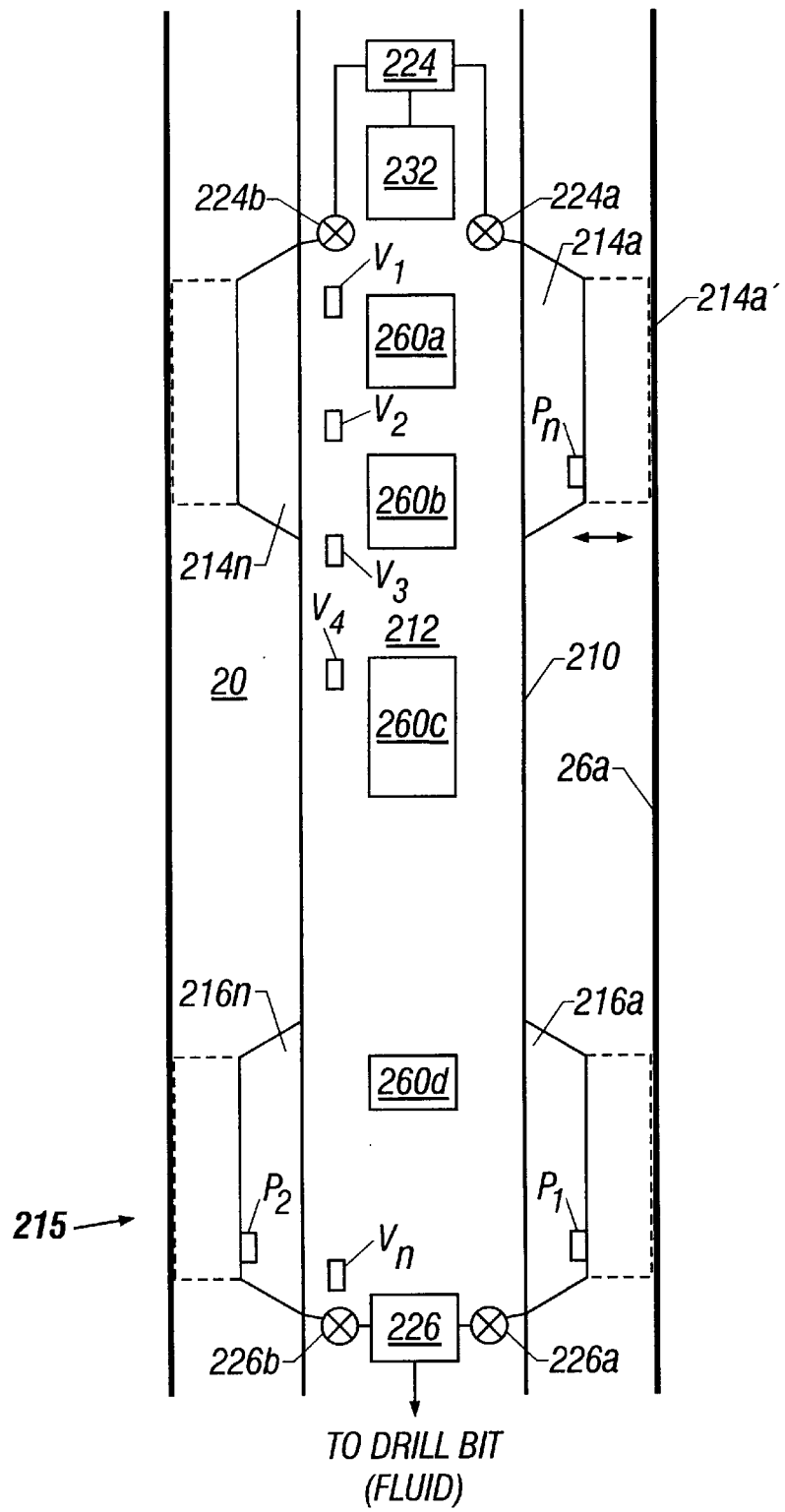
FIG. 2 is a schematic diagram of a section of the drilling assembly with two axially spaced stabilizers, a plurality of sensors and a control circuit for controlling the operation of the stabilizers.

FIG. 2 is a schematic diagram of a section of the BHA 90 (FIG. 1) with one preferred embodiment of the stabilization system 200 according to the present invention. The stabilization system 200 contains two stabilizers 214 and 216 disposed spaced apart from each other on the housing 210 of the BHA 90. Stabilizer 214 contains a plurality of expandable members 214a–214n (also referred to as the "arms" or "arm members"), each arm member being adapted to extend radially or outward from the housing 210 and collapse toward the housing 210. The solid lines of the arm members 214a–214n show such members in their respective collapsed positions while the dotted lines show such arm members in their respective extended positions. The second stabilizer 216 similarly contains a plurality of arm members 216a–216n disposed on the housing, wherein the solid lines and the dotted lines respectively represent the retracted positions the extended positions of such arm members.

Each of the arm members 214a–214n and 216a–216n is extendable enough to press against the borehole inside 26a. The arm members 214a–214n and 216a–216n are preferably independently adjustable, i.e., each such member can be expanded and retracted independent of the other arm members. The arm members 214a–214n and 216a–216n may be pads which are commonly used in downhole tools or ribs (described below) or expandable packers commonly used in the downhole tools or any other mechanism that can be installed on the BHA that is expandable to exert a desired force on the wellbore inside 26a. FIG. 2A shows an example of a relatively simple rib 260 that has an arm 262 hingedly attached to the tool body and a pad member 264 at the end of the arm 262. As the arm 262 is moved outward, the pad 264 comes in contact with the borehole wall 26a. The force exerted on the arm 262 causes the pad 264 to exert the force onto the borehole inside 26a. Any other configuration may be utilized for the purpose of this invention.

A power unit generally referred to by numeral 224, associated with the stabilizer 214 provides the required force to the individual arm members 214a–214n. In one configuration, the power unit 224 may be a common hydraulic power source, such as pump that supplies power to individual control valves or pistons 224a–224n associated with the arm members 214a–214n. Alternatively, each of the individual control units 224a–224n may be have its own power unit such as a hydraulic unit (pump), an electric motor or any other desired unit. A control circuit or processor 232 in the BHA 90 controls the operation of the power unit 224. The processor 232 preferably includes a microprocessor and associate memory and controls the operation of the individual arm members according to programmed instructions stored therein and/or provided from the surface. However, for the purpose of this invention, any circuit or processor that can independently control the arm members 224a–224n may be utilized.

A power unit 226 containing individual controls 226a–226n and an associated processor 236 are utilized for controlling the arm members 216a–216n of the lower stabilizer 216. Alternatively, equal force may be applied to the individual arm members 214a–214n and 216a–216n by their respective power units 224 and 226. This may be cone by supplying the hydraulic power to such arm members from a common source via hydraulic lines. In an alternative embodiment may include arm members that remain extended at all times due to the presence of a mechanical force applied thereto, such as by a spring.

The stabilization system 200 preferably includes a plurality of BHA sensors $V_1$–$V_p$ for measuring a physical parameter, such as vibration or acceleration, relating to the stabilization system 200 during the drilling of the wellbore 20. The BHA sensors $V_1$–$V_p$ may be placed distributed at suitable locations on the BHA section 212 to provide a profile of the desired physical parameter of the section 212. A separate pressure sensor P is preferably disposed in the individual arm members. A plurality of pressure sensors P are arranged on the packer element when such is utilized as a stabilizer. Alternatively, position sensors, displacement sensors, distance measuring sensors, acoustic standoff sensors may be utilized to determine the extension of the arm members 24a–24n relative to their respective predefined reference positions, such as their respective retracted positions.

Formation evaluation and other sensors or portions, generally denoted herein by the numeral 260, whose measurements are affected by the vibration of the BHA 90, are disposed in the stabilized section 212. The sensors 260 may include nuclear magnetic resonance sensors, resistivity sensors, acoustic sensors, ultrasonic sensors, imaging sensors, nuclear sensors and any other desired sensors. Formation evaluation and other sensors may be disposed in the arm members or the stabilizer elements that come in contact with the borehole interior 26a. During the drilling operations, the BHA section 212 vibrates due to the rotary action of the drill bit. The one or more of the BHA sensors $V_1$–$V_p$ are used to determine the vibration at one or more locations of the section 212. The controller circuits 234 and 236 adjust the force applied by their associated arm members on the wellbore inside 26a so as to maintain the value of the physical parameter (vibration etc.) or the profile (the vibration profile) below their respective predetermined values, preferably as determined by the sensors P. The sensors 260 are activated to take their respective measurements. Thus, the stabilization system 200 automatically controls the stabilizers 214 and 216 to maintain the parameter of interest of the section 212 of the BHA 90 within desired limits.

Figure 2B:
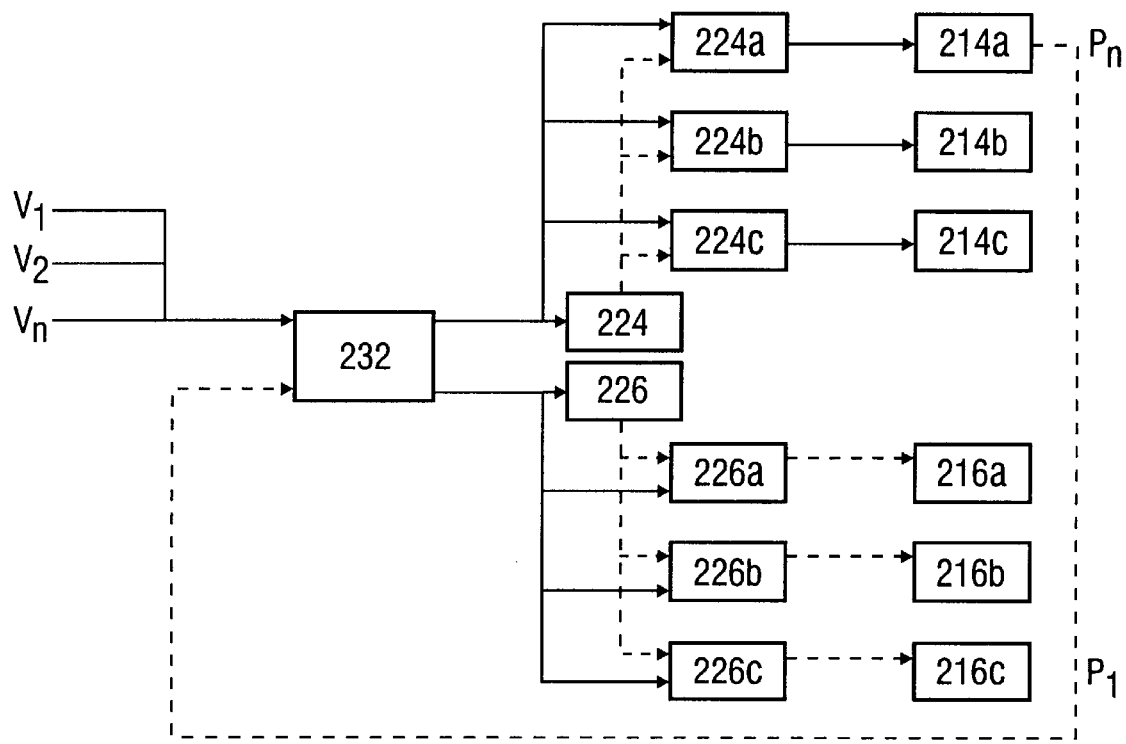
FIG. 2A is a schematic diagram of a rib device for use in the stabilizer system of the present invention.
Figures 2A, 3:
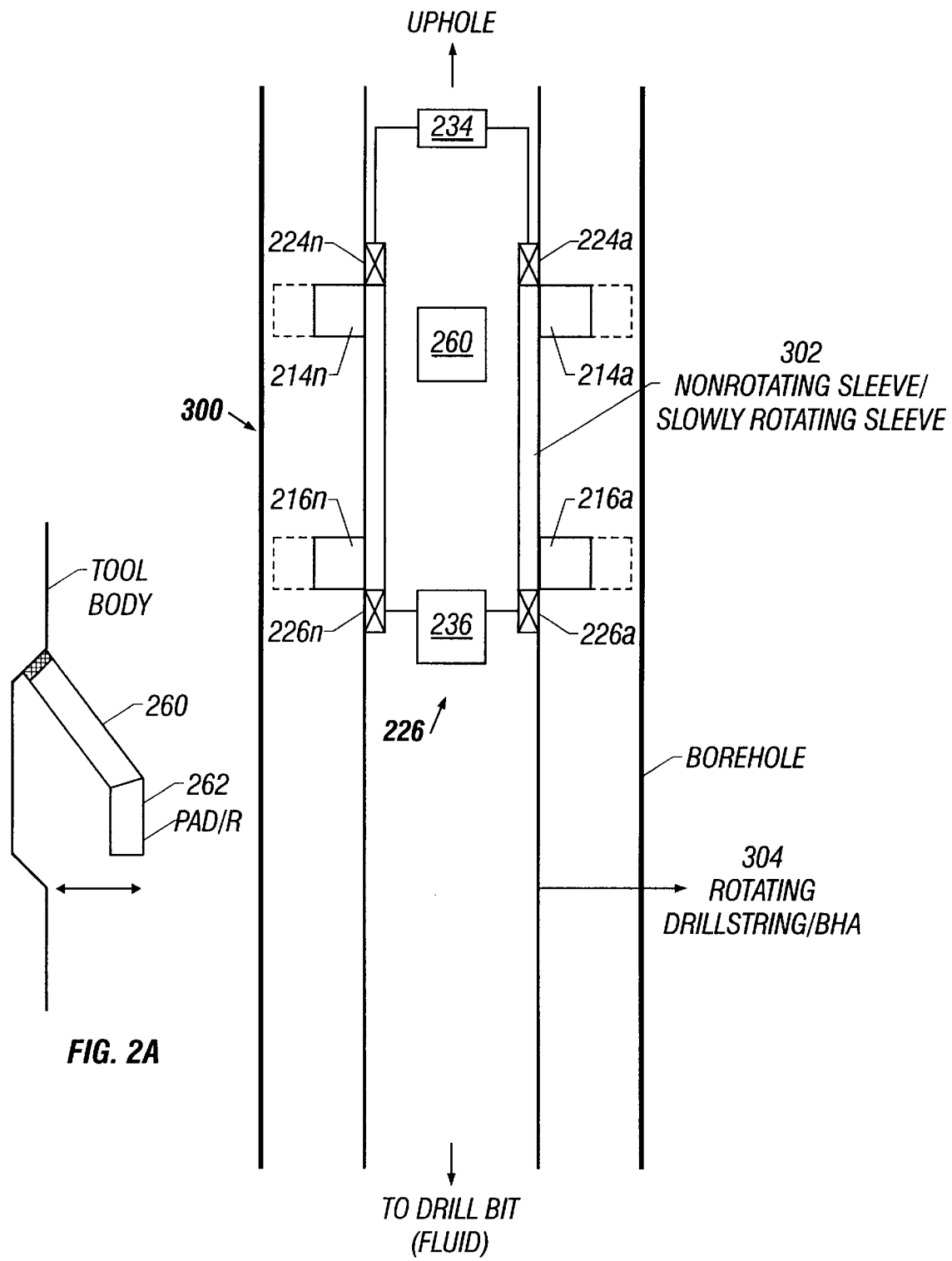
FIG. 3 is a schematic diagram of a section of the drilling assembly wherein the stabilizers are disposed on a substantially non-rotating member carried by the drilling assembly.

This is schematically illustrated in FIG. 2b. Shown is a single processor 232 that receives signals from the BHA sensors $V_1, V_2 \ldots V_n$ and the pressure sensors $P_1, P_2 \ldots P_n$. Based on the sensor measurements, the processor 232 sends a signal to the power units 224 and 226 to regulate the output of the power units. The processor also sends signals to the control units such as valves 224a, 224b . . . thereby adjusting the motion of the arms 214a, 214b . . . The resulting pressure of the pads against the formation wall is measured by the sensors $P_1, P_2 \ldots P_n$ and fed back to the processor. Based upon a stored program, the processor 232 determines the required output of the power units and the settings of the control units to maintain a desired profile for the amount of vibration as measured by the BHA sensors $V_1, V_2 \ldots V_n$ while staying within acceptable limits of the force applied by the pads 214 to the borehole wall. In FIG. 2b, one processor is shown as controlling the upper and lower set of stabilizers. Alternatively, a separate processor could be used for controlling each of the two sets of stabilizers.

FIG. 3 is a schematic diagram of the stabilization system 200 of FIG. 2 placed on a substantially non-rotating sleeve disposed on the BHA 90. In this configuration, the BHA 90 rotates as the drill string rotates to turn the drill bit. The BHA 90 contains a sleeve 302 disposed on BHA 304. The stabilizers 214 and 216 are disposed on the sleeve 302. When the stabilizers 214 and 216 urge against the borehole wall 26a, the sleeve 302 remains substantially stationary, i.e., it does not rotate with the drill string or the BHA 90, but may slowly turn due to the rotational forces of the drill string. It remains substantially stationary for the purposes of this invention. The various BHA sensors $V_1-V_p$, the formation evaluation and other sensors 260 and control devices 224 and 226 are disposed in the drill string as described are disposed as previously described with respect to FIG. 2. The BHA embodiment of FIG. 2, operates in the same manner as described earlier.

Figure 4:
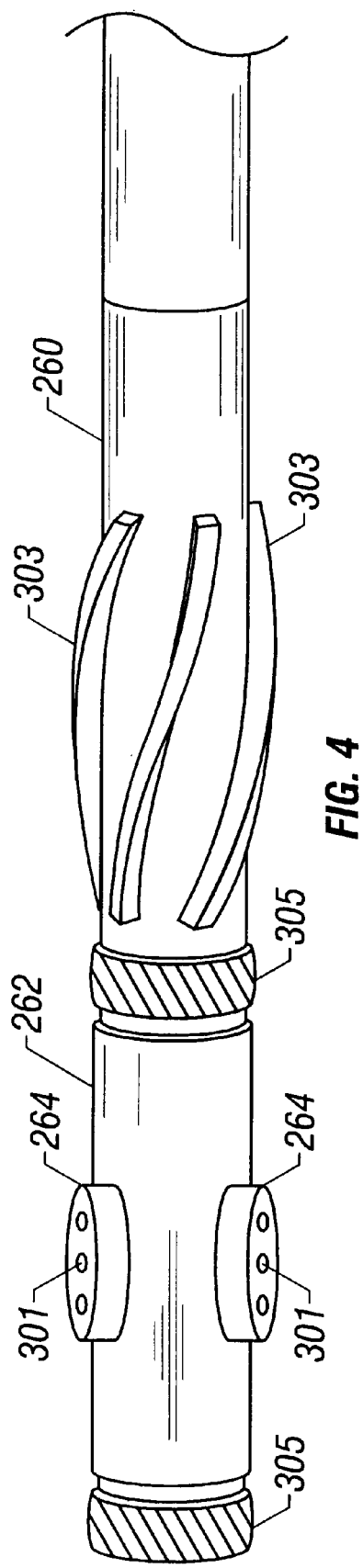
FIG. 4 illustrates the pads on a non-rotating sleeve used for resistivity measurements.

FIG. 4 illustrates the arrangement of the sensor pads in another embodiment of the present invention in which formation evaluation sensors are located on the pads. Shown are the drilling shaft 260 with the non-rotating sleeve 262 mounted thereon. The stabilizers discussed above have pads 264 mounted with sensors 301 are attached to sleeve 262. The mechanism for moving the pads out to contact the formation is not shown. Two toroids 305 that are wound with a current carrying conductor (not shown) surround the shaft. The toroids are arranged with same polarity, so that upon passage of a current in the toroid, a magnetic circumferential magnetic field is induced in the two toroids. This magnetic field, in turn, induces an electric field along the axis of the shaft. The leakage current measured by the sensors 301 is then a measure of the resistivity of the formation adjacent to the sensors, with the leakage current being substantially radial. Such an arrangement has been used before in wireline logging but has not been attempted before in measurement while drilling applications. The shaft 260 may be provided with stabilizer ribs 303 for controlling the direction of drilling. The sensors used for measuring the force of the pads against the formation are not shown in FIG. 4.

Figure 5:
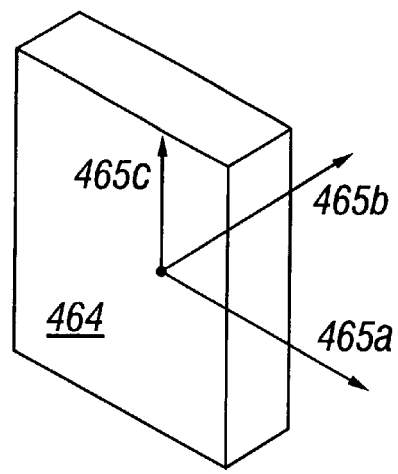
FIG. 5 illustrates the arrangement of elastic transducers on a pad.

The pads could also have elastic (commonly referred to as acoustic) transducers mounted on them. In the simplest arrangement shown in FIG. 5, at least one of the stabilizers has a pad with a three component transducer (or, equivalently, three single component transducers) mounted thereon. The transducer is adapted to engage the borehole wall and capable of pulsating or vibratory motion in three directions, labeled as 465a, 465b and 465c. Those versed in the art would recognize that each of these excitations generates compressional and shear waves into the formation. Synchronized motion of transducers on the plurality of pads introduces seismic pulses of different polarization into the formation that can be detected at other locations. In the simplest configuration, the detectors are located on the surface (not shown) and can be used for imaging the subsurface formations of the earth. Depending upon the direction of the pulses on the individual pads, compressional and polarized shear waves are preferentially radiated in different directions. In such a configuration, the force exerted by the transducers is a small fraction of the force used to maintain the pads on the stabilizers in contact with the formation, so that the pressure sensors (not shown) would not be significantly affected by the motion of the transducers. A suitable low pass filter is incorporated into the processor to make accurate measurements of the pressure of the pads against the formation.

Figure 6:
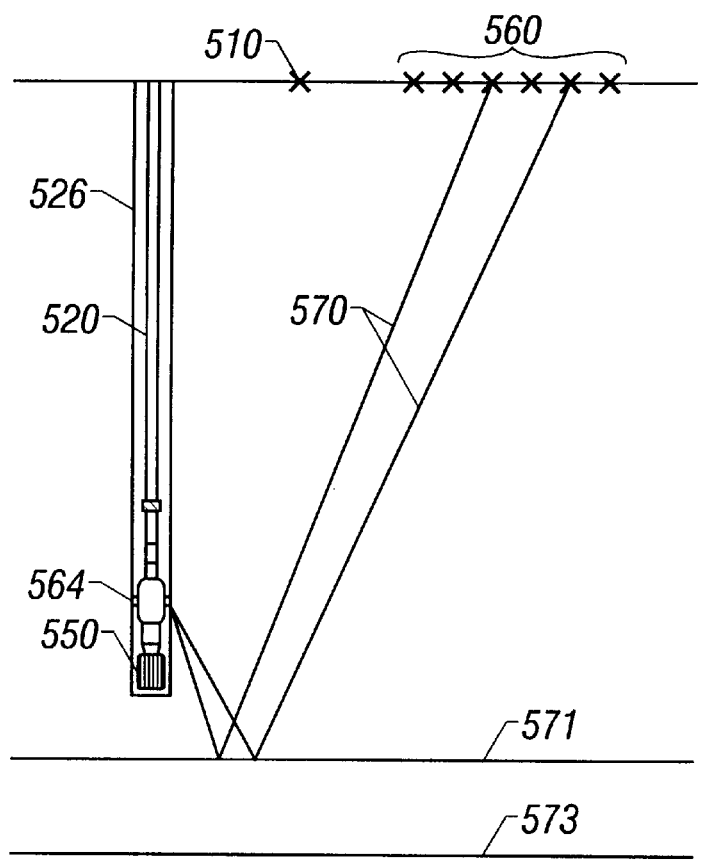
FIG. 6 illustrates the acquisition of a set of reverse VSP data according to the present invention.

FIG. 6 illustrates the acquisition of a set of reverse VSP data according to the present invention. A plurality of seismic detectors 560 are disposed at the surface 510. A borehole 526 drilled by a drill bit 550 at the end of a drillstring 520 is shown. The downhole drilling assembly includes seismic sources 564 on pads that engage the walls of the borehole. Seismic waves 570 radiating from the sources 564 are reflected by boundaries such as 571 and 573 and detected at the surface by the detectors 560. The detection of these at the surface for different depths of the drilling assembly gives what is called a reverse Vertical Seismic Profile (VSP) and is a powerful method of imaging formations ahead of the drill bit. Processing of the data according to known methods gives a seismic image of the subsurface. While reverse VSPs using the drill bit itself as a seismic source have been used in the past, results are generally not satisfactory due to a lack of knowledge of the characteristics of the seismic signal and due to poor S/N ratio. The present invention, in which the source is well characterized and is in essentially the same position on a non-rotating sleeve has the ability to improve the S/N ratio considerably by repeatedly exciting the sources in essentially the same position. Those versed in the seismic art would be familiar with the pattern of energy radiated into the formation by the different directions of motions of the transducers 465 and their arrangement on a circular array of pads.

Those versed in the art would recognize that by having an arrangement with four electrodes substantially in a linear arrangement on a number of non-rotating pads, the outer electrodes being a transmitter and a receiver respectively, and by measuring the potential difference between the inner electrodes, a resistivity measurement of the formation can be obtained. Such an arrangement is considered to be conventional in wireline logging applications but has hitherto not been used in measurement-while-drilling applications because of the difficulty in aligning the electrodes on a rotating drillstring.

Those versed in the art would also recognize that instead of seismic pulses, the seismic transmitters could also generate swept-frequency signals that continuously sweep through a selected range of frequencies. The signals recorded at the transmitters can be correlated with the swept frequency signal using well known techniques to produce a response equivalent to that of an impulsive seismic source. Such an arrangement requires less power for the transmitters and is intended to be within the scope of the invention.

The VSP configuration could be reversed to that of a conventional VSP, so that downhole sensors on a non-rotating sleeve measure seismic signals from a plurality of surface source positions. Such an arrangement would suffer from the disadvantage that a considerably greater amount of data would have to be transmitted uphole by telemetry.

In an alternate arrangement (not shown), two sets of axially spaced-apart pads are provided on the non-rotating sleeve. The second set of pads is not illustrated but it has an arrangement of detectors that measure three components of motion similar to the excitation produced by the sources 465. Those versed in the art would recognize that this gives the ability to measure compressional and shear velocities of the formation between the source and the receiver. In particular, because of the ability to directly couple a seismic source to the borehole wall, shear waves of different polarization can be generated and detected. Those versed in the art would know that in an anisotropic formation, two different shear waves with different polarization and velocity can be propagated (called the fast and the slow shear wave). Measurement of the fast and slow shear velocities gives information about fracturing of the formation and would be familiar to those versed in methods of processing the data to obtain this fracturing information.

The same arrangement of having seismic transmitters and receivers on non-rotating pads in the drilling assembly makes it possible to record reflections from surfaces in the vicinity of the borehole. In particular, it enables the device to obtain distances to seismic reflectors in the vicinity of the borehole. This information is useful in looking ahead of the drillbit and in guiding the drillbit where it is desired to follow a particular geologic formation.

Figure 7A:
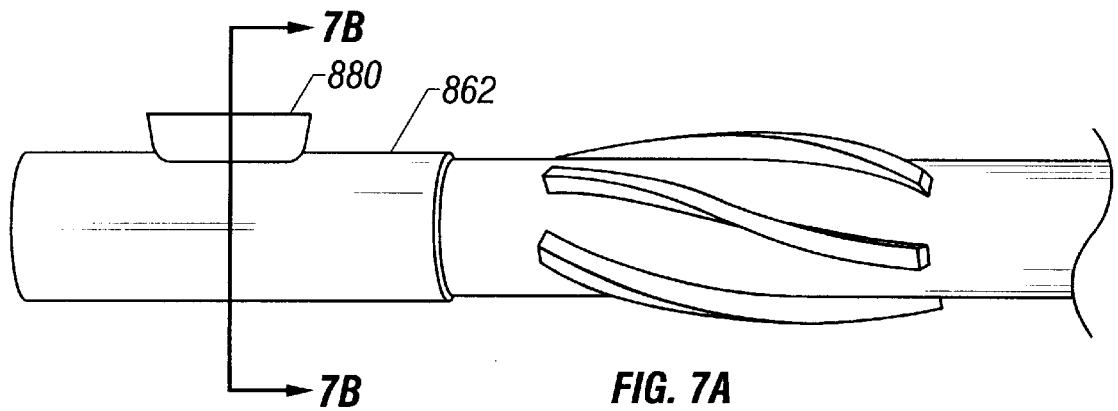
FIGS. 7A–7D are schematic illustrations of the invention in which NMR measurements are made using pad mounted sensors.

The basic sensor configuration of FIG. 4 is also used in another embodiment of the invention to make Nuclear Magnetic Resonance (NMR)measurements. This is illustrated schematically in FIGS. 7A and 7B. For simplifying the illustration, shown is a single pad 880 mounted on a stabilizer (not shown) on the sleeve 862 that makes contact with the borehole wall. Included in the pad is a permanent magnet assembly 883 denoted here by individual magnets 883*a*, 883*b* and 883*c*. In a preferred embodiment, the two magnets on the sides are oriented with like poles in the same direction and the magnet in the middle is oriented with its poles opposite to the poles of the side magnets. With the arrangement of magnets shown, a static magnetic field is produced within the formation adjacent to the pad 280. As would be known to those versed in the art, there is a region, known as the region of examination, within which the field strength is substantially constant and the field direction is radial.

Figure 7B:
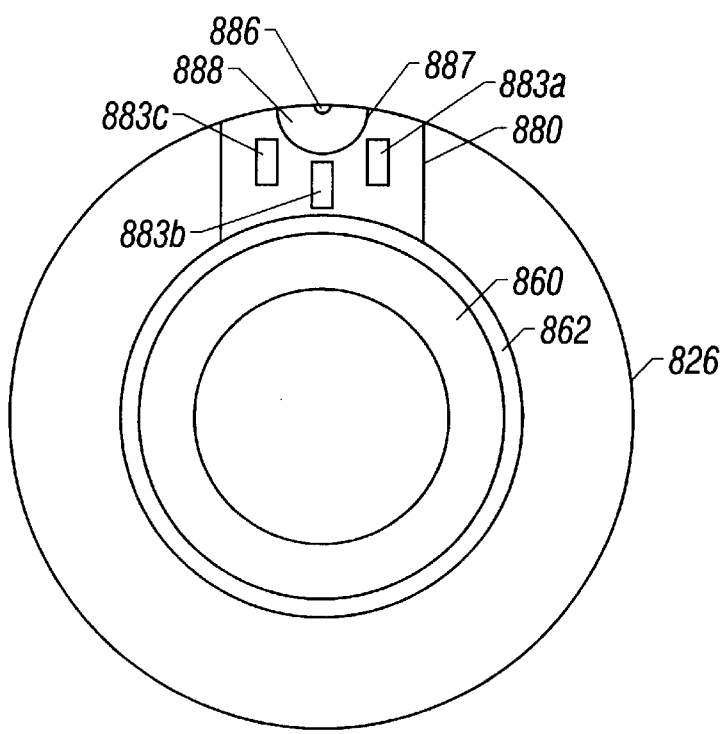

NMR measurements are made by inducing a Radio Frequency (RF) field in the formation that has a direction that is orthogonal to the static magnetic field and making measurements of the relaxation of the spin induced by the RF field. FIG. 7B shows one arrangement in which a conductor 886 is arranged in an axial direction in the pad 880 with a conducting sheath 888 and soft ferrite 887. By pulsing an RF current through the conductor 886 with a return path through the sheath 888, an RF magnetic field is induced in the formation with a substantially tangential field direction, i.e., circumferential with respect to the axis of the borehole. This is orthogonal to the static field in the region of examination. The transmitter is turned off and the arrangement is used to measure the RF field produced by the relaxation of the spin induced by the RF field within the formation.

Figure 7C:
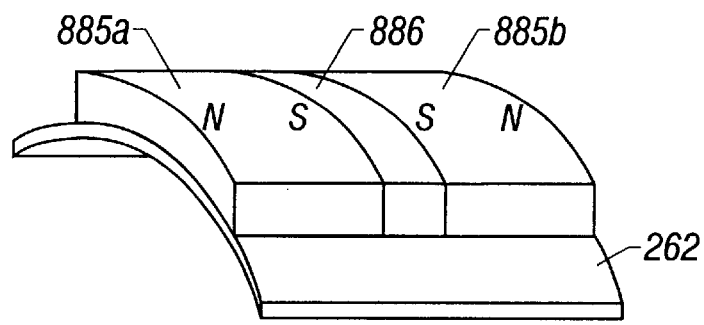

An alternate arrangement of the permanent magnets is illustrated in perspective view in FIG. 7C. A pair of permanent magnets 785*a* and 785*b* in the shape of arcuate segments of cylinders are disposed in an axial direction with the direction of magnetization of the two magnets in opposite directions. This, or similar arrangements comprising more than one pair of magnets, produces a region of examination in the formation with a substantially uniform field strength having a radial field direction. Inclusion of a ferrite element 786 between the magnets helps in shaping the region of examination. The RF coil arrangement of FIG. 7B is used to produce an RF field with a tangential component within the region of examination. This magnet and coil arrangement is mounted on a pad carried by one of the stabilizers (not shown). The pressure sensors are not shown.

Figure 7D:
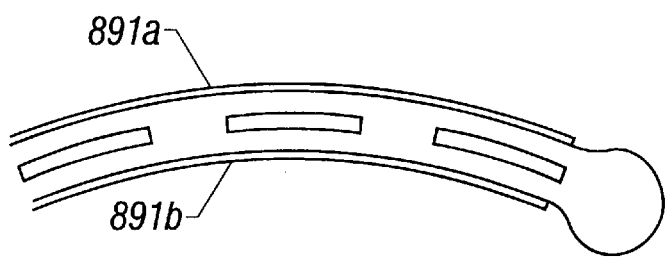

FIG. 7D illustrates an alternate RF antenna arrangement that can be used with the permanent magnet arrangements of FIG. 7B or FIG. 7C. Sheet conductors 791*a* and 791*b* are arranged in arcuate portions of the pad (not shown). When the antenna is pulsed with an RF signal, an RF magnetic field with a substantially longitudinal component is produced within the formation adjacent the pad. This field is orthogonal to the radial static field produced by the permanent magnet arrangements of FIG. 7B or FIG. 7C.

Those versed in the art would recognize that by using a single magnet (instead of a pair of opposed magnets) in the configuration of FIG. 7C, a static field that is substantially longitudinal is produced in the formation in the vicinity of the borehole. The RF antenna arrangement shown in FIG. 7B that produces an RF field in the formation having a substantially tangential component (circumferential with respect to the longitudinal axis) and could be used to make NMR measurements because of its orthogonality to the static field. Alternatively, a circular RF coil with its axis in a radial direction (not shown) with respect to the borehole axis can be used to produce a radial RF field that is orthogonal to the longitudinal static field to make NMR measurements.

Those versed in the art would also recognize that with any of the configurations discussed with reference to FIGS. 7A–7D, using a plurality of pads oriented in different directions, or by making measurements with a single pad at different azimuths, azimuthal variations in the NMR properties of the formation can be determined. Such an azimuthal variation could be caused by fractures in the formation that are aligned with fracture planes parallel to the axis of the borehole, so that the amount of fluid in the formation (which is what determines the NMR response) has an azimuthal variation. The azimuthal variations could also be measured on a single pad that is rotating sufficiently slowly that the region of examination does not change significantly during the time that the NMR measurements are made.

Figure 8:
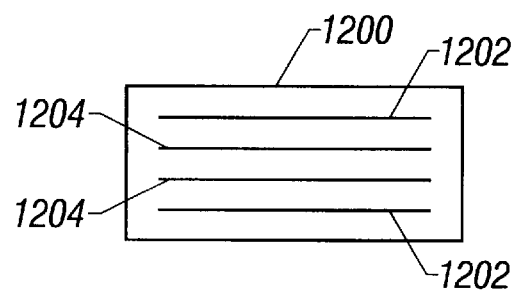
FIG. 8 is a schematic illustration of the invention for making high frequency electromagnetic induction measurements.

FIG. 8 shows transmitter-receiver module 1200 suitable for use for high frequency induction logging with a signal at 1 GHz or more. This module is mounted in on a pad, such as 880 in FIG. 7*a*. The module is provided with at least two transmitter slots 1202 and receiver slots 1204 with the respective transmitter and receiver coils (not shown) behind the slots. The transmitters are preferably disposed symmetrically about the receivers. Such symmetrical arrangements of transmitters and receivers for high frequency induction logging are known in the art and are not discussed further here. With the present invention, it is possible to obtain measurements of an azimuthal variation of the resistivity of the formation using such a module on a plurality of pads carried on stabilizers disposed circumferentially around the tool.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A drilling assembly carrying a drillbit for drilling a wellbore, the drilling assembly comprising:
    (a) at least one stabilizer carried by the drilling assembly, said at least one stabilizer having a plurality of independently operable members extending radially from the drilling assembly to exert force on the wellbore inside, at least one of said plurality of members disposed on a non-rotating sleeve and carrying a formation evaluation sensor thereon;
    (b) at least one sensor for measuring a parameter of interest relating to the drilling assembly;
    (c) a power source supplying power to at least one of the plurality of extendable members to cause said extendable member to exert force on the wellbore inside; and
    (d) a processor controlling the power source to adjust the force applied by said extendable member to the wellbore as a function of the parameter of interest.

2. The drilling assembly of claim 1, wherein the at least one stabilizer further comprises at least two axially spaced apart stabilizers.

3. The drilling assembly of claim 1 wherein the parameter of interest is selected from the group consisting of: (i) vibration, (ii) lateral displacement, (iii) whirl, (iv) backward rotation, (v) shock, (vi) buckling, (vii) acceleration, and, (viii) distance from the wellbore inside.

4. The drilling assembly of claim 1, wherein the at least one sensor includes a sensor selected from a group consisting of (i) a vibration sensor, (ii) an accelerometer, (iv) a position measuring sensor, and (iii) a distance measuring sensor.

5. The drilling assembly of claim 1, wherein the parameter of interest is selected from a group consisting of (i) vibration, (ii) acceleration, (iii) lateral motion, and (iv) distance between the drilling assembly and the wellbore inside.

6. The drilling assembly of claim 1, wherein the at least one sensor further comprises a plurality of spaced apart sensors for providing a profile of the parameter of interest relating to a section of interest of the drilling assembly.

7. The drilling assembly of claim 1 further comprising at least one pressure sensor for providing a measure of the force exerted by the at least one extendable member.

8. The drilling assembly of claim 7, wherein the at least one pressure sensor includes a first sensor for determining the force exerted by the arm members on the wellbore inside, and a second sensor for providing a measure of the displacement of the extendable member relative to a normal position.

9. The drilling assembly of claim 1, wherein the processor causes the power source to adjust the force applied by the at least one extendable member to maintain the parameter of interest below a predetermined value.

10. The drilling assembly of claim 9, wherein the parameter of interest is a physical characteristic of the drilling assembly during the drilling of the borehole.

11. The drilling assembly of claim 1, wherein the at least one extendable member is selected from a group consisting of (i) a pad, (ii) a rib, and (iii) a packer element.

12. The drilling assembly of claim 1, wherein the at least one extendable member is disposed on a sleeve carried by the drilling assembly, said sleeve having a rotational speed substantially lower than a rotational speed of the drillbit during drilling of the wellbore.

13. The drilling assembly of claim 1 wherein the processor controls the power supply at least in part in response to a signal from an uphole location.

14. The drilling assembly of claim 1, wherein the formation evaluation sensor is selected from a group consisting of (i) a nuclear magnetic resonance sensor, (ii) an electromagnetic induction sensor, (iii) a nuclear sensor, (iv) an acoustic sensor, (v) an ultrasonic sensor, and (vi) a resistivity sensor.

15. The drilling assembly of claim 1, wherein the formation evaluation sensor is carried by the extendable member.

16. The drilling assembly of claim 1, wherein the formation evaluation sensor comes in contact with the wellbore inside during taking measurements by said formation evaluation sensor.

17. The drilling assembly of claim 1, wherein the drilling assembly is adapted to determine a parameter of interest during one of (i) drilling of the wellbore, and (ii) during retrieval of the drilling assembly from the wellbore.

18. A drilling assembly for use in an oilfield wellbore, comprising:
    (a) a body having a longitudinal axis along the wellbore;
    (b) at least one stabilizer having a plurality of arm members, each said arm members carrying a formation evaluation sensor, and disposed on a substantially non rotating sleeve, and adapted to extend away from the body to exert force on the wellbore inside;
    (c) a first sensor system associated with the body, said first sensor system measuring a physical parameter of the drilling assembly downhole;
    (d) a power source causing each said arm member to independently apply force on the wellbore inside; and
    (e) a processor operatively coupled to the power source, said processor causing said power source to adjust the force applied by the arm members in a manner that maintains the value of the physical parameter below a predetermined level.

19. The drilling assembly of claim 18 wherein the first sensor system measures a parameter selected from the group consisting of: (i) vibration, (ii) lateral displacement, (iii) whirl, (iv) backward rotation, (v) shock, (vi) buckling, (vii) acceleration, and, (viii) distance from the wellbore inside.

20. The drilling assembly of claim 18, wherein the formation evaluation sensor is selected from a group consisting of (i) a nuclear magnetic resonance sensor, (ii) an electromagnetic induction sensor, (iii) a nuclear sensor, (iv) an acoustic sensor, (v) an ultrasonic sensor, and (vi) a resistivity sensor.

21. The drilling assembly of claim 18 further comprising a second sensor system for providing a measure of the force exerted by each of the plurality of arm members.

22. A method of obtaining measurements in a wellbore by a drilling assembly, the method comprising:
    (a) providing at least one stabilizer on the drilling assembly, said stabilizer including a plurality of arm members on a substantially non-rotating sleeve, each said arm member being independently adjustable to exert force on the wellbore inside;
    (b) determining a physical parameter of the drilling assembly from a sensor system associated with the drilling assembly;
    (c) determining a parameter of interest of the formation using a formation evaluation sensor on an arm member; and
    (d) adjusting the force exerted by the arm members so as to maintain the physical parameter below a predetermined value.

23. The method of claim 22 further comprising measuring, by using a pressure sensor, the force applied on the wellbore inside by the plurality of arm members.

24. The method of claim 22 wherein the physical parameter of the drilling assembly is selected from the group consisting of: (i) vibration, (ii) lateral displacement, (iii) whirl, (iv) backward rotation, (v) shock, (vi) buckling, (vii) acceleration, and, (viii) distance from the wellbore inside.

25. The method of claim 23 wherein said formation evaluation sensor is selected from: (i) a nuclear magnetic resonance sensor, (ii) an electromagnetic induction sensor, (iii) a nuclear sensor, (iv) an acoustic sensor, (v) an ultrasonic sensor, and (vi) a resistivity sensor.

26. The method of claim 23 further comprising adjusting the force exerted by the plurality of arm members as a function of the physical parameter of the drilling assembly and the measured force.

27. The method of claim 23, wherein the physical parameter is vibration associated with at least one location on the drilling assembly.

* * * * *